United States Patent [19]
Jacobs et al.

[11] 3,807,413
[45] Apr. 30, 1974

[54] DRIVE MEANS FOR THE ROTORS OF AXIAL FLOW TYPE HARVESTING MACHINES

[75] Inventors: Gerard Octaaf Jacobs, Ichtegem; Francois Van Herpe, Morelgem, both of Belgium

[73] Assignee: Clayson N.V., Zedelgem, Belgium

[22] Filed: June 27, 1972

[21] Appl. No.: 266,809

[30] Foreign Application Priority Data
June 30, 1971 Belgium .......................... 769267

[52] U.S. Cl. .................................. 130/27 T, 130/6
[51] Int. Cl. ............................................. A01f 7/06
[58] Field of Search ................... 130/6, 27 R, 27 T

[56] References Cited
UNITED STATES PATENTS

| | | |
|---|---|---|
| 3,126,688 | 3/1964 | Karlsson .................. 130/6 |
| 3,669,121 | 6/1972 | Rowland-Hill ............ 130/27 T |
| 3,701,239 | 11/1972 | Hennen .................... 130/27 T |
| 2,351,807 | 6/1944 | Court ........................ 130/6 |

Primary Examiner—Antonio F. Guida
Attorney, Agent, or Firm—Frank A. Seemar; John R. Flanagan; Joseph A. Brown

[57] ABSTRACT

The invention comprises an improved drive mechanism for the rotors of axial flow type harvesting machines such as combine harvesters and corn shellers, wherein the axial flow type rotors extend generally longitudinally of the machine and are beared at one end in bearings provided on the harvester framework and are supported on, and coupled to output shafts of gearboxes at their other end, the gearboxes being secured to a transversally extending part of the framework.

9 Claims, 9 Drawing Figures

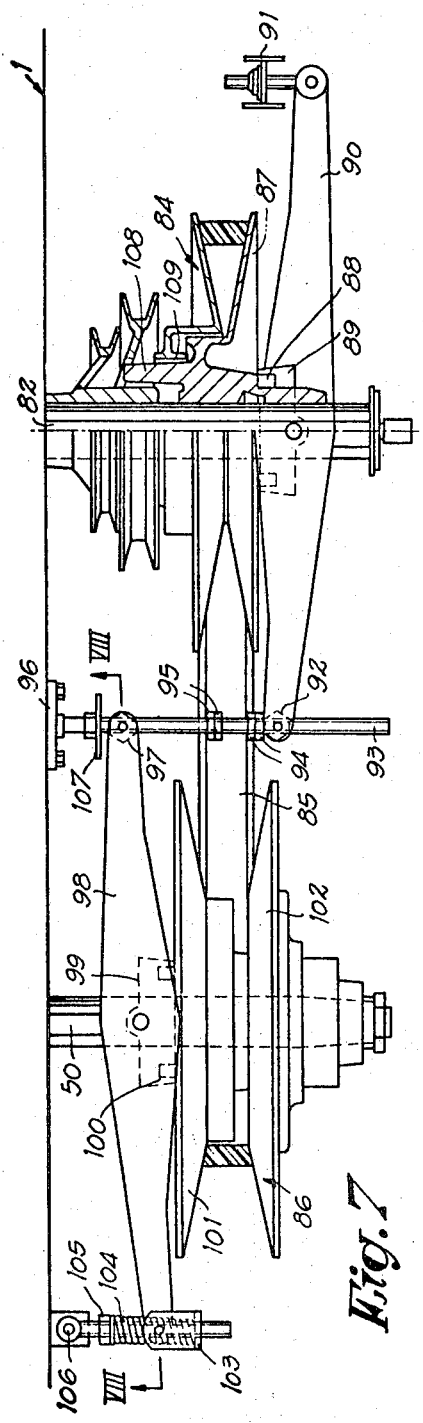
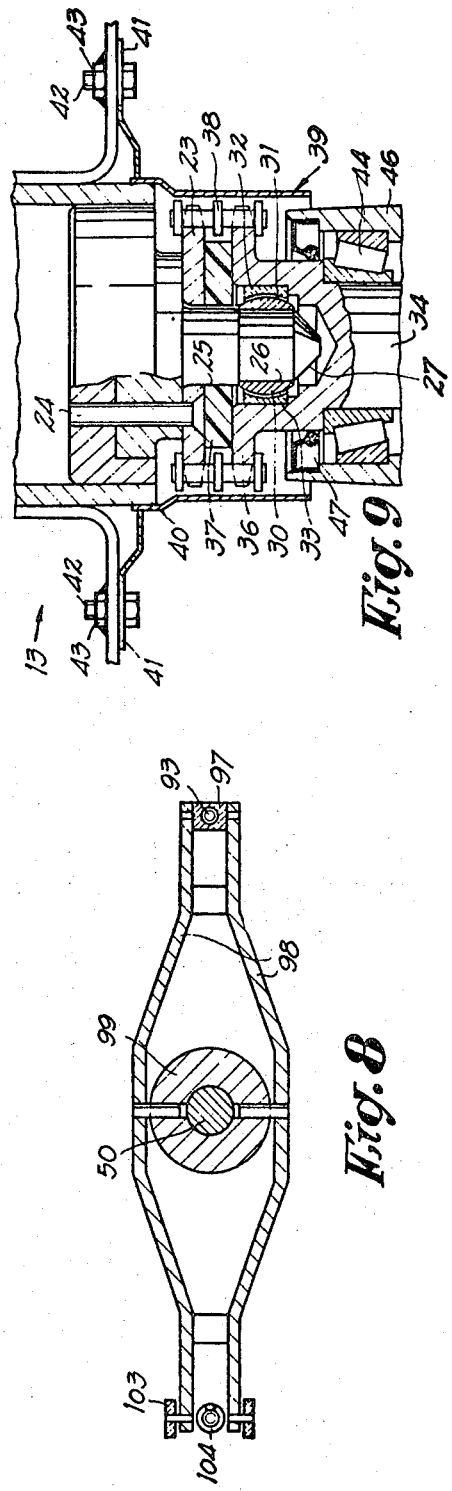
Fig. 7
Fig. 8
Fig. 9

DRIVE MEANS FOR THE ROTORS OF AXIAL FLOW TYPE HARVESTING MACHINES

BACKGROUND OF THE INVENTION

1. Field of the Invention

The present invention relates to axial flow type harvesting machines such as combine harvesters having one or more axial flow type crop handling mechanisms extending in general fore-and-aft direction, and more particularly to the drive mechanism of such axial flow type crop handling mechanisms on axial flow type harvesting machines.

As generally known in the art, axial flow type combine harvesters have a cutting device in front of a so-called header for cutting the standing crop, a header and straw elevator for feeding the cut crop into the crop handling means; and crop handling means mainly comprising axial flow type threshing and separating means for threshing the cut crop material and for separating grains from the straw, and a cleaning mechanism for cleaning the threshed and separated grains. The axial flow type threshing and separating means comprise rotor means which are rotated around their longitudinally extending axis.

2. Description of the Prior Art

In conventional machines, the threshing mechanism comprises a rotatable cylinder having its axis of rotation extending in a direction transverse to the longitudinal direction. The drive means of this cylinder are arranged alongside the side wall of the combine framework.

As conventional combines, axial flow type combines having axial flow type threshing and separating mechanisms are provided with large front traction wheels and rear steerable wheels and are provided at the front side with a header and crop elevator means for the mowing and the feeding of the cut crops to the axial flow type threshing units. Feeding mechanisms at the front side of the threshing units bring the crop from the elevator means to the threshing and separating sections. The latter thresh the crop and the grains therefrom, whereafter the threshed crop or straw is further processed in the separating sections to further separate the grain which is still entrailed in said threshed crop. In such axial flow type combine, the threshed grain falls onto a grain cleaning mechanism which in general can be of the type as applied in conventional combines. The threshed crop or straw is fed to the rear end of the separating mechanism and is conveyed towards a discharge mechanism which is, for example, formed by a rotatable straw beater being installed transversally of the longitudinal axis of the machine and which grips the straw and discharges it to the ground at the rear end of the machine. At the same time, this straw beater exercises a beating effect on the straw mat, so that part of the grain which would otherwise be lost, is still recuperated.

Such an axial flow type combine has a very high output and is, for one and the same capacity, compared with a conventional combine, much more compact and more particularly much shorter. The main reason for this is that the total length of the axial flow type threshing and separating mechanism is considerably smaller than the length of the conventional combination of a threshing cylinder with straw walkers. The difference is of the size of half the length of the conventional threshing and separating mechanism.

In known axial flow type combines the engine is positioned on top of the axial flow type threshing and separating means and has its crank shaft extending in generally longitudinally direction. This may enable a simple drive structure of the axial flow type rotor means but is disadvantageous for other reasons. The mounting of the engine on top of the axial flow type threshing and separating means makes that the machine has a center of gravity which is positioned at a large height above the ground, whereby the stability of the machine is reduced considerably. Further, due to the positioning of the engine with its crankshaft in a generally longitudinal direction, all other drive means for driving e.g. the traction wheels and other combine components are complicated as they should e.g. comprise heavy duty bevel gear transmission.

SUMMARY OF THE INVENTION

The present invention aims at a simple and compact drive means of the harvester components, and more particularly of the axial flow type rotor means. The present invention relates to improved drive and mounting means for the rotor(s) of axial flow type harvesting machines, such as combine harvesters and corn shellers, whereby the engine is positioned so that its crank shaft extends generally transverse of the longitudinal axis. The engine may further preferably be positioned generally rearwardly of the axial flow type crop handling means, whereby its possible to position the engine at a smaller height above the ground level and whereby the center of gravity is lowered.

The harvesting machine mainly comprises for this purpose, a framework, at least one generally longitudinally extending axial flow type crop handling rotor means having a front end and a rear end, rotor bearing means on the framework for bearing one end of the rotor means and rotor drive transmission means supported on the framework and having an output shaft, for supporting the other end of the rotor means and for driving the rotor means. The drive means may comprise a transversally extending input shaft which brings the motive power from the engine to bevel gears provided in a gear box; the latter gearbox being mounted on the combine framework and having an output shaft extending in a generally longitudinal direction which generally coincides with the associated rotor axis. The output shaft is beared in said gearbox and comprises rotor shaft supporting and coupling means.

By the above arrangement the aim for a simple and compact structure of the rotor drive means is obtained. Indeed, in this arrangement few components are needed and the drive and mounting means are of a simple structure. By making use of a driving mechanism according to the invention such an axial flow type combine can be made lighter, with less parts and more compact whereby the driving mechanism is very cheap and very reliable.

Another advantage that is obtained by applying a driving mechanism according to the invention is that the engine, which is installed on known axial flow type combines either on top of the rotors or on top of the driving mechanism of these rotors, can be installed lower by application of the compact driving mechanism according to the invention, so that a lower center of gravity of the machine is obtained. Indeed, with the present compact driving mechanism according to the invention, the rotors, the driving mechanism and the engine can be installed behind each other.

Another advantage that is obtained by applying a driving mechanism according to the invention is that a belt variator of the type that is provided with two adjusting arms can be applied, whereby a precise variator adjustment becomes possible.

Other objects and advantages will appear from the following description of an example of the invention, when considered in connection with the accompanying drawings, and the novel features will be particularly pointed out in the appended claims.

In the drawings

FIG. 2 is a perspective view of the drive means seen in the direction of arrow F2 in FIG. 1, whereby the parts that are installed in front of the mechanism, are removed.

FIG. 3 is a sectional view on line III—III in FIG. 2.

FIG. 4 is a sectional view on line IV—IV in FIG. 3.

FIG. 7 is a schematical and partial view on line VII—VII in FIG. 6.

FIG. 8 is a sectional view on line VIII—VIII in FIG. 7.

FIG. 9 is a sectional view on a greater scale of the part that is indicated in FIG. 3 by arrow F9.

Figure 1:
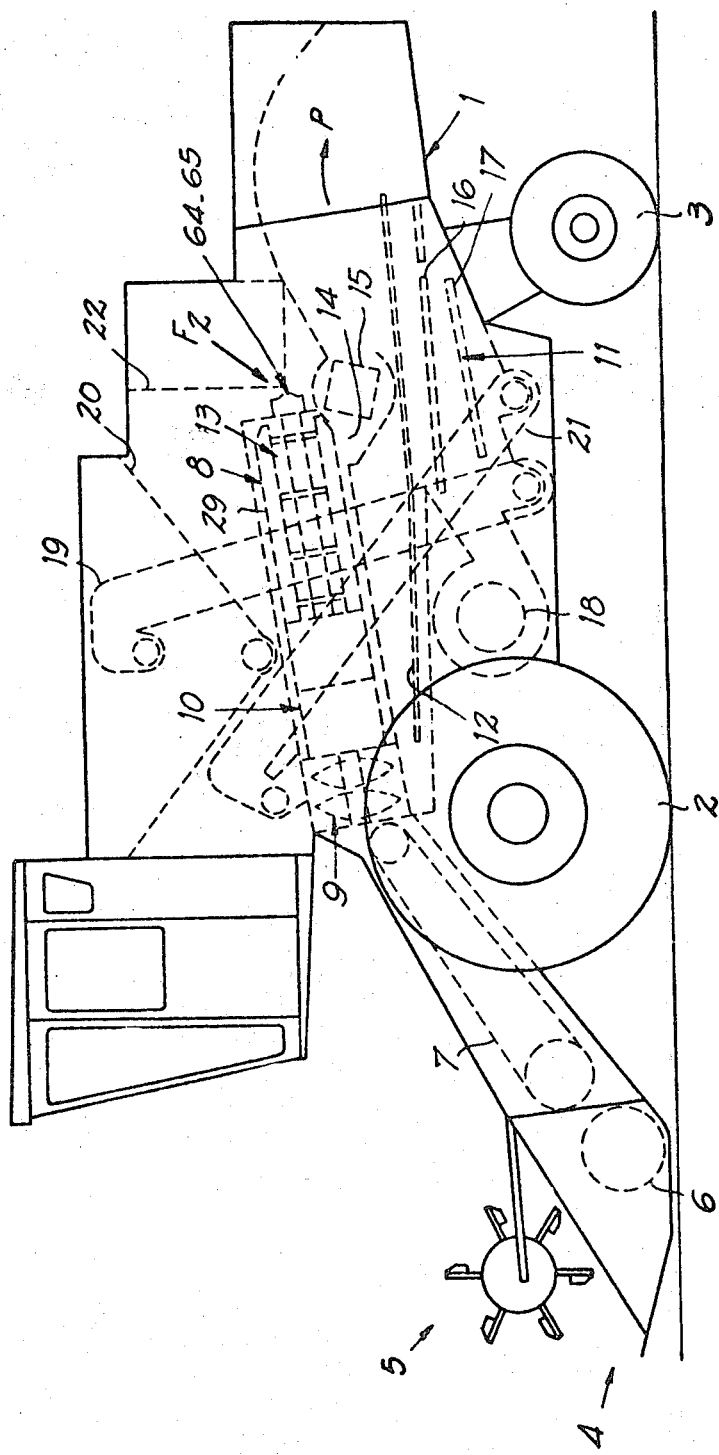
FIG. 1 is a schematic side view of an axial flow type combine with a rotor drive and mounting means according to the invention.
Figure 5:
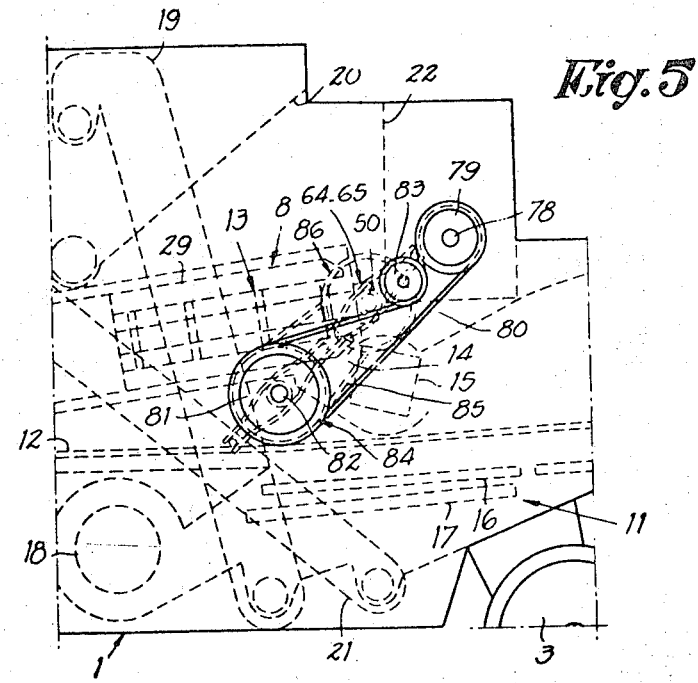
FIG. 5 and 6 are respectively a left and a right hand side elevational view of a part of the combine particularly to illustrate the drive transmission from the engine crank shaft to the drive means for the rotors according to the invention.
Figure 6:
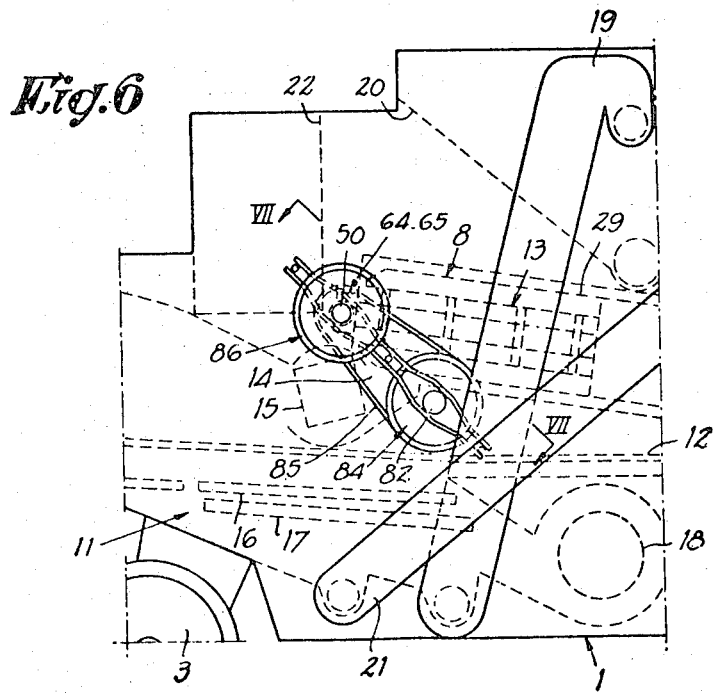

DESCRIPTION OF THE PREFERRED EMBODIMENT.

The combine described hereafter in greater detail by way of a non-limiting example is of the twin rotor axial flow type structure, comprising two rotors disposed in side-by-side relation and extending in generally longitudinal direction and which are driven in opposite direction and are moving downwardly at their adjacent sides.

Such a combine mainly consists of a framework 1 supported on large front traction wheels 2 and rear smaller and steerable wheels 3. The combine supports at its forward end a header 4 on top of which a reel 5 is installed for in operation to harvest the crop, that is to say to cut the standing crop and to convey the cut crop rearwardly towards a header auger 6 installed in the header trough and operable to feed the harvested crop to the crop elevator 7. This elevator 7 is installed rearwardly of the header and is arranged to convey the harvested crop upwardly and rearwardly to the threshing and separating means. The crop elevator 7 extends towards, in this preferred embodiment, two rotors 8 which extend rearwardly in generally longitudinal direction and are arranged in side-by-side relation generally parallel to each other. Each of these rotors 8 comprise front feeding means 9, operable to convey the crops received from the crop elevator means 7 further rearwardly in axial direction; axial flow type threshing and separating means 10, operable to thresh the crop received from the front feeding means 9, to separate grain and chaff from the straw material and to discharge said grain and chaff onto the grainpan 12 which forms part of the cleaning mechanism 11, and axial flow type separating means 13.

Each separating means 13 is provided at its rear extreme end with a downwardly facing opening 14. A straw discharge means 15 rotatably arranged underneath said opening 14 is operable to discharge the straw material onto the ground in a direction indicated by arrow P.

The aforementioned grain cleaning mechanism may be of the conventional type which mainly comprises the aforementioned grain pan 12, chaff and grain sieves 16–17 and a fan 18. Furthermore, such a combine is provided with a grain elevator 19 which feeds the grain received from the grain cleaning mechanism to the grain tank 20 and a tailingselevator 21 which feeds the tailings, that is to say unthreshed or incompletely threshed material, from the grain cleaning mechanism to the feeding means 9.

The power source or engine for driving the combine and its components is in the present preferred embodiment installed in the space which is shematically indicated by 22.

The shafts of each of the rotors 8 are beared in a front support which is not shown in the drawings. Each of these shafts is, according to the present invention, provided with a sprocket 23, connected thereto by e.g. bolts 24. These shafts further comprise rearwardly facing first and second extensions, respectively 25 and 26 having a smaller diameter. The extension 26 is provided with a tapered extreme end 27.

The length of the shafts of each rotor 8 is chosen as such that the free extreme end 27 thereof does not extend past the free extreme end 28 of the separator elements 29 of the separating means 13.

The aforesaid extension 26 of each shaft is beared in a self aligning sleeve bearing 30 which in turn, by the provision of preferably a coat 31 of self greasing material, for example Teflon, is beared in a bipartite element 32. This bipartite element 32 is provided in a central recess 33 which for that purpose is applied in the output shaft 34 of a gear transmission 35. The output shaft 34 supports at the end facing towards the sprocket 23 a sprocket 36 which is identic to the former 23. Between the sprockets 23 and 36, a sealing 37 is applied for example in plastic rubber or the like, in order to prevent that dust penetrates in the self aligning sleeve bearing 30–31-32.

By connecting the rotor shafts 8 and the output shafts 34 in this way, one obtains that small misalignments thereof will not be harmful to the structure.

The shaft of each rotor 8 is further connected with the associated output shaft 34 by means of a so called Duplex chain 38 which is put around the aforesaid sprockets 23 and 36. This chain of which in this case, the ends are not connected with each other, is kept around the sprockets by means of a bushing 39 which closely surrounds to chain 38. This bushing 39 is provided with a part 40 with greater diameter which can be moved over the end of the associated rotor shaft having a larger diameter than the extensions 25–26. The latter portion 40 supports a flange 41 for by means of bolts 42 and weld nuts 43, enabling fixation thereof to the rotor 8.

Due to the restricted space which is available at this location, a connection between the sprockets 23 and 36 by means of a chain 38 which is kept by a bushing 39 on the sprockets is preferred rather than a connection by which the extreme ends of the aforesaid chain 38 are connected with each other for example by a special locking part, cotter pin, or the like. However, this does not mean that the latter coupling means could not be applied in a suitable way.

The aforesaid output shafts 34 are beared in bearings, respectively 44 and 45 which are mounted themselves in a housing 46 of which the extreme end that faces towards the associated rotor is sealed by means of a sealing ring 47.

The second free extreme end of each output shaft 34 supports a bevel gear 48 that is in continuous operative relation with a second bevel gear 49 which is fixed on an input shaft 50. The latter is rotatably applied in a second housing 53 by means of bearings, respectively 51 and 52. Both housings 46 and 53 are assembled together by means of bolts 54. The input shaft 50 extends in line with another shaft 55, which itself is rotatably applied in a third housing 58 by means of bearings 56-57; the housing 58 also being bolted by means of bolts 59 to the housing 46 of the second rotor. The bevel gear 49 of one rotor is secured on shaft 50 whereas on the shaft 55, the bevel gear 49 of the second rotor is provided.

Each of the bearings 51-52-56 and 57 are sealed by means of a sealing ring, respectively 60-61 and 62-63.

The housings 53 and 46 on one hand, and 58 and the second housing 46 on the other hand, form in this way two gear boxes, respectively 64 and 65, which are secured to a cross profile 66 of the combine framework by means of bolts, respectively 67 and 68.

The aligning of the gear boxes 64 and 65 during the assembly can be omitted because they are mounted on one and the same support 66 having suitable openings which each have a collar, respectively 69 and 70 for receiving the associated collar 71 of the housing 46.

Sprockets, respectively 72 and 73 are secured to the extreme ends of the shafts 50 and 55 which face each other for enabling to make a drivable connection by means of a Duplex chain coupler 74. The free ends of the Duplex chain 74, may at this location be coupled to each other by means of the conventional latching means such as a cotter pin or the like. Obviously, it is also possible to make use of a bushing similar to the bushing 39 which has been described hereabove, for holding the Duplex chain in its coupling position, relative to the sprockets 72 and 73.

As the gear boxes 64 and 65 will be filled with oil to ensure a good operation, each gear box is provided with a filling plug 75, a level gauge plug 76 and a draining plug 77.

In this way, one obtains a very compact construction of the transmission elements from the shaft 50 to the shafts of the rotors 8, by which the installation of such rotors will take place by moving them from the front side of the machine in the associated housings until the tapered extreme end 27 of the associated shaft penetrates in the self aligning sleeve bearing 30. In order to enable this, the rotors ought to be lifted somewhat at the rear end which can be done after having removed on one hand a cover plate in the grain tank bottom and on the other hand, the covers that are provided in the rotor housings.

Figures 2, 3, 4:
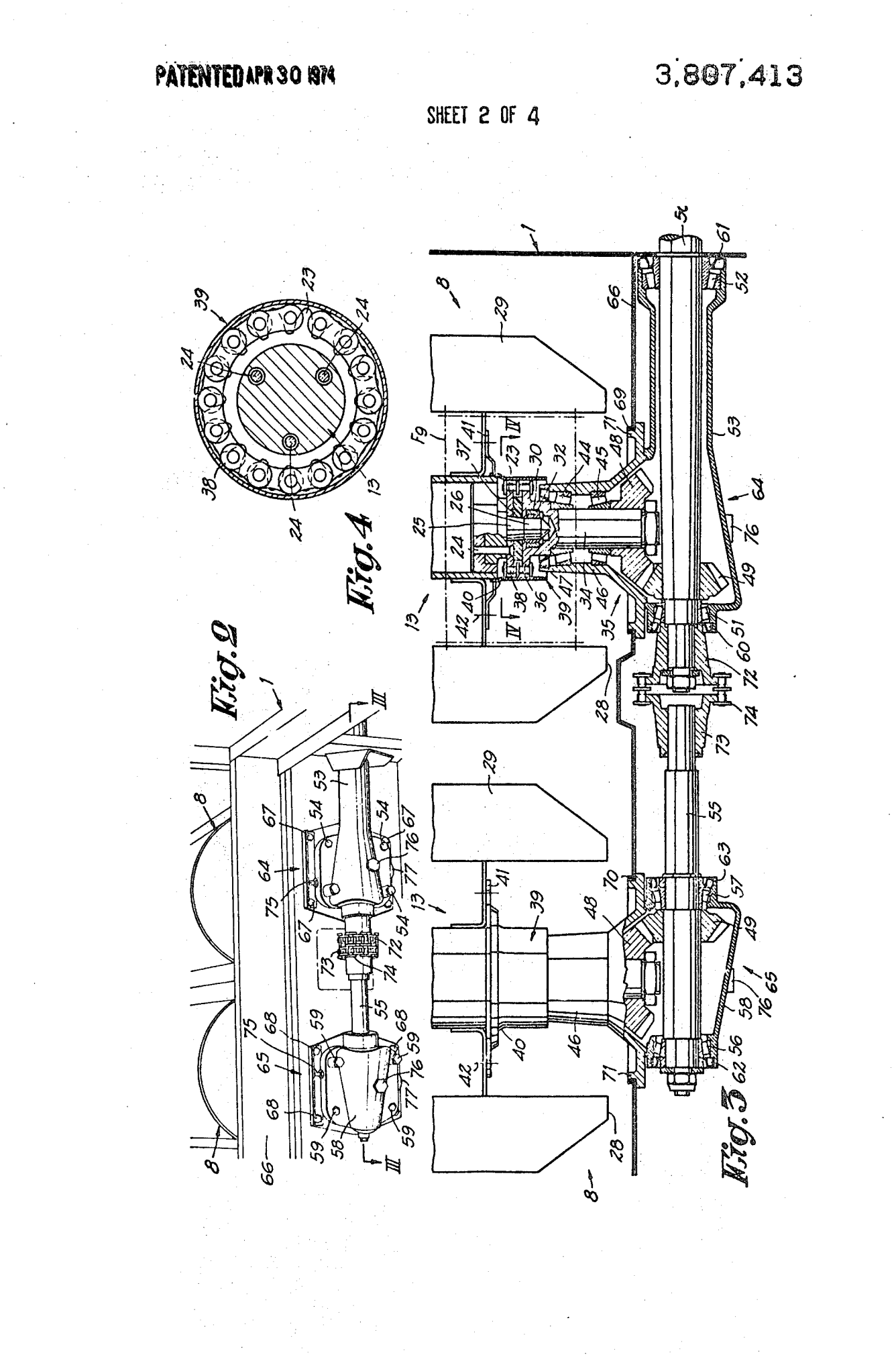

When the shafts of the rotors are connected in this way with the aforesaid output shafts 34, one will apply the aforesaid chain 38 around the sprockets 23 and 26 and move the bushing 39, which is at that moment around housing 46, in the position as represented in FIGS. 3 and 9 and firmly connect this bushing with the associated rotor by means of bolts 42 in order to obtain an operative drive coupling between the rotors and the drive means.

By this compact construction of the aforesaid transmission elements, one obtains that the engine can be mounted lower, this means behind the rear end of the threshing and separating means, and the drive means thereof without having to move said engine further rearwardly.

Since, according to the present invention, the rotor shafts are directly supported by the output shafts 34, which in turn are beared by means of the housings 46 on the only cross profile 66, one obtains that for each rotor shaft with its drive means only two bearing points are needed.

This cross profile 66 forms in some way a partition and serves at the same time as a support for the covers which cover the openings in the rear portions of the rotor housings.

By the mutual connection of each housing 46 with a housing 53, respectively 58, one obtains that eventual deformation of the machine frame work has no influence on the gear boxes.

One also obtains in this way, that eventual repairs and the like underneath the engine can be accomplished much easier since the lower portion thereof is better accessible. Indeed, the aforesaid gear boxes and associated supporting profile do not hinder at all when doing service and/or repair work or the like underneath the engine which was formerly not the case.

One also obtains a driving mechanism with which it is possible to drive the rotors as such that they start their threshing action at different points of time. The coupling means with the aforesaid Duplex chains allow to position the rotors at different angular positions with respect to each other.

Furthermore, the mechanism according to the invention allows a simple assembly, disassembly, maintenance and repair. Indeed, each part that ought to be disassembled and re-assembled for one or another reason, can be removed and re-installed without on beforehand having to disassemble many other elements. This is true as well for the rotors as for the gear boxes. For example, replacing the front bearings of the rotors can be done very easily because the Duplex chain coupling allows a small angular displacement of the rotors. Thus the rotors can rest on the concaves without detaching the driving mechanism while the aforesaid front bearings are replaced.

The drive of the rotors 8 from the engine mainly takes place as follows : on the engine shaft 78, a pulley 79 is mounted, whereon a belt 80 is applied, which in turn cooperates with another pulley 81, the latter being secured on an intermediate shaft 82 which drives different parts of the combine.

A main idler 83 can cooperate with said bolt 80 for upon engagement with said belt 80 to ensure the drive of pulley 81.

The intermediate shaft 82 extends across the machine and is provided at its second free extreme end with a first variator half 84 which drives a second variator half 86 by means of a belt 85; the latter variator half being fixed on the aforesaid input shaft 50 in order to drive the aforesaid output shafts 34 and the rotors 8 by means of the above described transmission means.

The aforesaid belt variator 84-85-86 is of the type that is provided with two adjusting arms. This type of variators is preferred since its adjustment is positive in contrast to the ones by which the position of at least one half is controlled by a spring and by which the transmission ratio can change undesirably in certain circumstances.

In order to be able to provide such a belt variator with two adjusting arms, the driving and driven shaft must preferably be situated close to each other, which was not the case with former versions since the shaft 50 was relatively far distanced from the intermediate shaft 82.

According to the present invention, especially by the particular driving mechanism according to the invention, one obtains however, that the shafts 50 and 82 are installed rather close to each other so that such a belt variator that is preferred can be provided without any difficulties.

Such a belt variator is schematically represented in FIGS. 7 and 8 and is mainly formed by an axially displaceable disc 87 which is kept by a thrust bearing 88 provided in a retaining block 89 against the belt 85. The retaining block 89 is pivotably connected with the variator arm 90 which is pivotably connected at one extreme end with a fixed support 91, whereas the second extreme end is provided with a part 92 pivotably supported thereon and which itself is provided with internal screw threads.

With the latter, a screw threaded rod 93 cooperates on which adjustable stops, respectively 94 and 95 are applied. The free extreme end of this screw threaded rod 93 is beared in a support 96.

A second part 97, being provided with an internal screw thread, and which is hinged to one extreme end of the second variator arm 98, is operatively mounted on the other end of said screw threaded rod 93. The latter supports a retaining block 99, which by means of a thrust bearing 100, presses on the displacable variator disc 101 which in turn presses the belt 85 against the fixed variator disc 102.

The second free extreme end of the aforesaid variator arm 98 is hinged to for example a U-shaped intermediate part 103 on which a spring 104 acts. The latter rests with its other extreme end on an adjustable support 105 which by means of a spindle 106 is hinged to a fixed part of the machine. The spring 104 determines the tension with which the belt 85 is pressed between the associated variator discs and consequently said spring also determines the belt tension.

Furthermore, a sprocket 107 is secured on the aforesaid screw threaded rod 93. Said sprocket 107 is connected to a suitable adjusting mechanism, which is not shown in the figures.

In this way, one obtains that, when the screw threaded rod is turned the variator arms 90 and 98 are displaced in the same direction, whereby one variator half opens while the other variator half becomes narrower and whereby the transmission ratio changes.

The displacable discs 87 and 101 are furthermore provided with teeth 108 which continuously cooperate with notches 109 that are provided in the fixed variator discs.

In the position shown in the drawings (FIG. 7) the driving speed of the shaft 50 is maximum.

The mechanism according the invention enables to chose the speed range of the belt variator as such so that this variator acts on an optimum speed range by which the durability of the variator belt is maximum. Indeed, the speed range of the variator is not directly determined by the operation of the rotors themselves since the gear boxes enable to apply a suitable reduction.

The present invention is not at all restricted to the version described as an example and represented on the enclosed drawings, but such a driving mechanism can be realized in all shapes and dimensions without departure from the scope of the invention, and may as well be combined with an axial flow type corn sheller as with the above described axial flow type combine harvester.

What we claim is:

1. An improved axial flow combine of the type having a framework, at least one generally longitudinally extending axial flow type crop handling rotor means having a front end and a rear end and being disposed between forward and rearward portions of said framework, and rotor drive transmission means supported on said rearward portion of said framework adjacent to, but on an opposite side thereof from, said rear end of said rotor means, wherein the improvement comprises:

rotor bearing means on said forward portion of said framework for releasably and rotatably bearing said front end of rotor means; and said rotor drive transmission means having a rotatable output shaft means extending through said rearward portion of said framework for releasably bearing said rear end of said rotor means and for driving said rotor means, whereby said rotor means may be released from said rotor bearing means and said output shaft means for removal of said rotor means from said combine for servicing without having to first dismount said rotor drive transmission means from said framework.

2. An improved axial flow combine according to claim 1, wherein said drive transmission means includes a gearbox mounted on said opposite side of said rearward framework portion and having said rotatable output shaft means extending therefrom through said rearward framework portion.

3. An improved axial flow combine according to claim 1, wherein crop handling elements are arranged on rotor means for operating on crops capable of being harvested by said combine with rear ends of said crop handling elements extending at least partially over said output shaft of said drive transmission means.

4. An improved axial flow combine according to claim 1, wherein said rotor means includes a rotor shaft at its rear end and said output shaft has self aligning bearing means mounted in a recess formed in the end of said output shaft for operatively bearing said rotor shaft.

5. An improved axial flow combine according to claim 4, wherein coupling means are provided on said rotor shaft and on said output shaft for enabling to driveably couple said rotor means to said drive transmission means.

6. An improved axial flow combine according to claim 5, wherein said coupling means comprise sprockets secured to said rear end of said rotor shaft and said end of said output shaft facing towards each other, and wherein a duplex chain is operatively mounted on both sprockets for driveably coupling said rotor means and said transmission means.

7. An improved axial flow combine according to claim 6, wherein a removable bushing is disposed around said coupling means having an inner diameter generally corresponding to the outer diameter of said coupling means for holding duplex chain in operative coupling position.

8. An improved axial flow combine according to claim 1 further comprising an engine for driving said rotor means via said drive transmission means, said rotor means, said drive transmission means and said engine being positioned one behind the other for providing a low profile combine.

9. An improved axial flow combine according to claim 8, further comprising a belt variator of the type with two adjusting arms for transmitting the motive power from said engine to said output shaft of said drive transmission means at a variable transmission ratio.

* * * * *